United States Patent
Perlmutter

(10) Patent No.: US 9,124,696 B2
(45) Date of Patent: Sep. 1, 2015

(54) CUSTOMER-ENABLED EVALUATION AND CONTROL OF COMMUNICATION CENTER AGENT CONTACT

(71) Applicant: Genesys Telecommunications Laboratories, Inc., Daly City, CA (US)

(72) Inventor: S. Michael Perlmutter, San Francisco, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/280,541

(22) Filed: May 16, 2014

(65) Prior Publication Data

US 2014/0254789 A1   Sep. 11, 2014

Related U.S. Application Data

(63) Continuation of application No. 11/965,053, filed on Dec. 27, 2007, now abandoned.

(51) Int. Cl.
*H04M 3/00* (2006.01)
*H04M 5/00* (2006.01)
*H04M 3/51* (2006.01)
*H04M 3/42* (2006.01)
*H04M 3/523* (2006.01)

(52) U.S. Cl.
CPC .......... *H04M 3/5166* (2013.01); *H04M 3/4217* (2013.01); *H04M 3/5183* (2013.01); *H04M 3/5232* (2013.01); *H04M 3/5231* (2013.01); *H04M 2203/408* (2013.01)

(58) Field of Classification Search
CPC ........ G06Q 10/06; H04M 3/323; H04M 3/36; H04M 3/4285; H04M 3/493; H04M 3/51; H04M 3/5166; H04M 3/5175; H04M 3/5183; H04M 3/523; H04M 3/5232; H04M 3/5233; H04M 3/5237; H04M 3/5238; H04M 2203/2011; H04M 2203/2061; H04M 2242/12
USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | |
|---|---|---|---|
| 5,590,188 A | 12/1996 | Crockett | |
| 6,233,332 B1 * | 5/2001 | Anderson et al. | ........ 379/265.09 |
| 6,985,576 B1 | 1/2006 | Huck | |
| 6,988,126 B2 * | 1/2006 | Wilcock et al. | ............... 709/204 |
| 7,564,962 B1 | 7/2009 | O'Keeffe et al. | |
| 2001/0011228 A1 | 8/2001 | Shenkman | |
| 2002/0055973 A1 * | 5/2002 | Low et al. | ...................... 709/204 |
| 2002/0055974 A1 * | 5/2002 | Hawkes et al. | ............... 709/204 |
| 2002/0055975 A1 | 5/2002 | Petrovykh | |
| 2002/0062347 A1 * | 5/2002 | Low et al. | ...................... 709/204 |
| 2002/0073150 A1 * | 6/2002 | Wilcock | ........................ 709/204 |
| 2002/0087393 A1 | 7/2002 | Philonenko | |

(Continued)

*Primary Examiner* — Khai N Nguyen
(74) *Attorney, Agent, or Firm* — Christie, Parker & Hale, LLP

(57) ABSTRACT

A communication center has agents operating at workstations and enabled to interact with customers, a router for routing incoming transactions from customers to agents, and routing rule sets associated with specific customers. Individual ones of the rule sets include one or more contact constraints set by the customer associated with the rule set.

20 Claims, 2 Drawing Sheets

(56) References Cited

U.S. PATENT DOCUMENTS

| | | |
|---|---|---|
| 2003/0037113 A1 | 2/2003 | Petrovykh |
| 2005/0135596 A1 | 6/2005 | Zhao |
| 2006/0002540 A1 * | 1/2006 | Kreiner et al. .......... 379/265.02 |
| 2006/0262922 A1 | 11/2006 | Margulies et al. |
| 2007/0133780 A1 | 6/2007 | Berner et al. |
| 2007/0230681 A1 | 10/2007 | Boyer et al. |
| 2008/0118052 A1 | 5/2008 | Houmaidi et al. |
| 2009/0168989 A1 | 7/2009 | Perlmutter |

* cited by examiner

201

Time of communication: __21.04.33__

Agent identification: __Agent 007__

Purpose of communication: _____

Were you satisfied with the agent's handling of the communication?

Yes ☐ No ☐

Do you strongly wish to communicate with this agent in future tranasctions?

Yes ☐ No ☐

Would you prefer to avoid this agent in future transactions?

Yes ☐ No ☐

Comments: _____

*Fig. 2*

CUSTOMER-ENABLED EVALUATION AND CONTROL OF COMMUNICATION CENTER AGENT CONTACT

CROSS-REFERENCE TO RELATED APPLICATIONS

This application is a continuation of U.S. patent application Ser. No. 11/965,053, filed on Dec. 27, 2007, the disclosure of which is hereby incorporated by reference.

BACKGROUND OF THE INVENTION

1. Field of the Invention

This invention is in the field of communication center technology, and pertains more particularly to enabling customers of communication centers to evaluate agents of the center and to exercise some measure of control over contact with agents.

2. Description of Related Art

Communication centers and related technology are very well-known in the art, and most people have had experience with contacting a communication center for any of a variety of services. For example, vendors of electronic appliances, banking services, insurance companies, and a nearly inexhaustible supply of businesses have reason to deal with large numbers of clients seeking service, through communication centers.

These communication centers were until relatively recently before the filing of the present application termed call centers, because the technology applied in the main to telephone calls; originally conventional connection-oriented switched technology (COST) calls, and more recently data-network telephone (DNT) calls. More recently such centers have expanded to provide communication through text messaging, emails, chat rooms, and any and every means of communication.

It is true, as stated above, that most people, as of the time of filing the present application, have had some experience with one or more communication centers, and, unfortunately, the experiences are not always rewarding. It is common for callers to be routed to queues, such as in an automatic call distribution (ACD) system. These delays can be frustrating, and technology has advanced to offer call back services and the like, wherein a caller may elect to be called at a certain time and place of the callers choosing.

After being connected to an agent, a caller may sometimes discover, even after the delay, that the agent is the wrong agent, and the call must be re-routed. And even when the connection is to an agent that might help, not all agents are equal and always even-tempered and helpful, and not all callers are compatible with all agents. Customers may quite often come away from such an experience dissatisfied or angry.

Since happy customers are a desirable outcome of nearly all contacts, it has occurred to the present inventor that it would be in the interest of an enterprise that uses call centers to have access to the opinions of customer/callers relative to the performance of agents of the center, and it might also be desirable and beneficial to even allow some control by callers of to which agents their calls might be directed.

BRIEF SUMMARY OF THE INVENTION

The inventor, in an effort to enhance customer satisfaction, and therefore the potential for future business for an enterprise hosting a communication center for providing services to customers, has determined a need for customers to have some input in setting rules for routing transactions of those particular customers to agents, under certain conditions.

In one embodiment a communication center is provided, comprising agents operating at workstations and enabled to interact with customers, a router for routing incoming transactions from customers to agents, and routing rule sets associated with specific customers. Individual ones of the rule sets include one or more constraints set by the customer associated with the rule set.

In another aspect of the invention a method for managing contact preferences in a communication center is provided, comprising steps of (a) providing customers during or after an interaction with an agent a mechanism for indicating one or more preferences regarding future contacts with the same agent; (b) storing constraints input from customers in rule sets associated with specific customers for use by a transaction router; and (c) using a customer ID, accessing the stored constraints by the router, and incorporating the constraints in routing in the event of a subsequent transaction from a customer.

In yet another aspect a router for routing transactions to agents in a communication center is provided, comprising a mechanism for identifying a customer upon receiving a transaction to route, stored rule sets associated with individual customers, and a mechanism for finding a rule set associated with the customer who initiated the transaction, and for applying the rule set in routing the transaction.

In various embodiments of the invention, for the first time a mechanism is afforded for customers to set routing constraints.

BRIEF DESCRIPTION OF THE SEVERAL VIEWS OF THE DRAWINGS

FIG. 2 is an illustration of an interactive window in a display for initiating or editing a rule set in an embodiment of the invention.

DETAILED DESCRIPTION OF THE INVENTION

Figure 1:
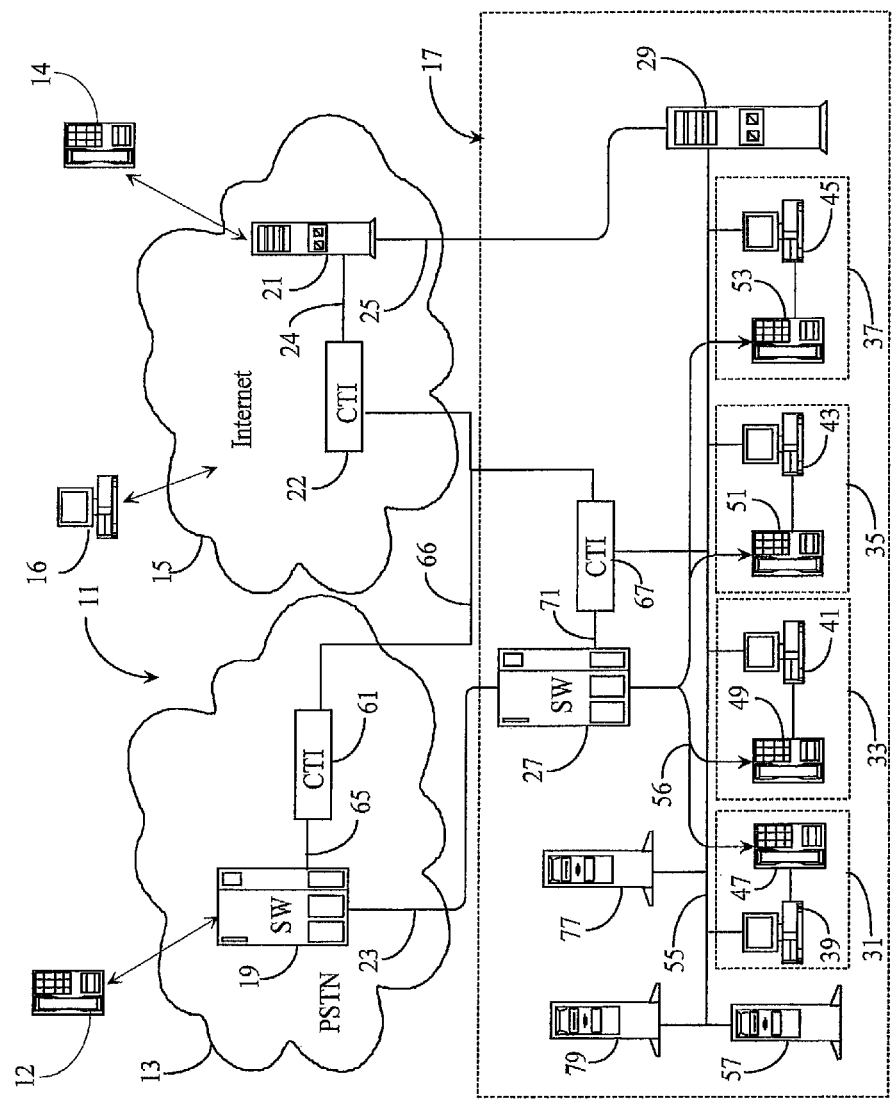
FIG. 1 is a diagram of a communication center in an embodiment of the present invention.

FIG. 1 is a diagram illustrating a communication center 17 connected through both a publicly-switched telephone network (PSTN) and an Internet-Protocol Network Telephony (IPNT) network 15 to customer phones represented either by telephone 12 or 14, and to customer computer stations represented by station 16. This diagram is meant to be exemplary of communication service centers in general, and not to be specifically limiting in embodiments of the invention. It is well-known that there are a wide variety of ways such communication centers may be implemented, and some may provide media and services that others do not.

In exemplary center 17 agent stations are represented by stations 31, 33, 35 and 37, and each agent station is illustrated with a telephone (47, 49, 51 and 53), and a computer (39, 41, 43 and 45). These are stations where agents work in the communication center and to which calls and other transactions from customers and others may be routed and connected. The four stations illustrated are exemplary, and there may be fewer or many more agent stations. Moreover, some agents associated with the center may work at home or other sites (remote agents), and still operate as agents of the center. Further, the architecture at agent stations may vary widely as well, and there are many sorts of communication devices that might be used, and many sorts of computers executing many sorts of software.

In center 17 agent stations are shown interconnected on a local area network 55, which is common, and several servers 57, 79 and 77 are illustrated as well. The servers may store data and execute software for use by agents. For example, one of the servers may be a statistical server (Stat Server) keeping track of transaction activity, call duration, and much other information for use by agents, other operational software associated with the center, and also by routing functions associated with the center.

A telephony switch 27 is shown connected to agent stations by internal telephone lines 56, and by a trunk line 23 to a network-level switch 19 in PSTN network 13. Switch 27 receives incoming calls from switch 19 and routes same to agents at agent stations. Such calls are typically queued and routed by software running as a part of a computer telephony integration (CTI) server 67, which is enabled to monitor all transactions of switch 27, and also to control switch 27.

In its routing functions CTI server 67 may access information stored and updated in other servers, such as the Stat Server described above, and may make routing decisions based on many factors, such as load, caller ID, agent skill, and much more.

In this particular center an ISPN server 29 is illustrated as connected to LAN 55 and to a server 21 in Internet 15, also connected to a CTI server 22 by connection 24. Another CTI server 61 connects to switch 19 in the PSTN by connection 65, and the CTI servers are interconnected by link 66. The CTI servers may thus communicate on lines separate from the communication lines, to coordinate activities of the switches and nodes to which they are connected.

Switch 19 in the PSTN in this example receives calls from customers, the calls represented as coming from telephone 12, which is meant to be representative of all PSTN capable devices that customers might use. In some cases such calls may originate in different networks in different protocols, and may finally arrive at switch 19, to be routed on to switch 27 in the call center.

IPNT calls are received by server 21 in the Internet network, from callers and devices represented by telephone 14, which is meant to represent all sorts of devices that may originate IPNT calls. Such calls may originate at widely variant sources in different formats, and may be converted and routed in different ways before reaching server 21. At server 21 such calls are routed on to server 29 in the communication center, where they may be further routed on LAN 55 to agent stations. The agent stations may handle these calls using software executing on station computers, or by other devices (smart telephones and the like). The telephones and computer indications at agent stations are meant to represent all of these sorts of devices that might be used. Server 29 has access to Stat Server as well, and may execute the same or similar software for queuing and routing transactions that may be used by CTI server 67 in routing PSTN calls. In another embodiment there may be a CTI server connected and operable with server 29 as well, and in another an integrated switch and server may handle and route both ISPN and PSTN calls.

Other sorts of transactions than IPNT calls may be sent to communication center 17 by customers in this example, such as emails, text messages, chat sessions, and more, and these are represented as originating at computer 16, meant to represent all sorts of devices that may connect to Internet 15 in all sorts of ways, and originate such transactions, which may be then routed on the server 29, and by LAN 55 to agents at agent stations.

In following description IPNT calls, PSTN calls, text messages, emails, and all sorts of other transactions originated by customers of call center 17 to call center agents, typically for service, are referred to as transactions, which when used should be taken to mean any or all such transactions, unless otherwise noted.

In a typical transaction an agent and a customer interact. The interaction may be in real time, as in a PSTN call, or may be near real time, as in a chat session, or may be delayed, such as in email and email reply. Typically a customer, especially in a real-time transaction, may have been delayed and on hold in a queue while waiting for an active agent, and may be impatient.

When a transaction between a customer and an agent is complete, the customer will invariably have a fresh opinion of the performance of the agent in representing the enterprise that hosts the communication center. In some cases that opinion will be positive of the agent (and therefore may reflect well on the enterprise). The customer who has had such a positive experience may well prefer to interact with the same agent on any subsequent contact, but would typically not be aware of any way that might be done. Alternatively the customer may have had an ordinary experience, be at least marginally satisfied, and may not care at all whether the same agent might be available again. In other cases a customer may have had an unsatisfactory, even a bitter experience, and might not ever wish to deal with the same agent, and still would not know how to accomplish such a constraint.

In an embodiment of the present invention the customer is enabled to register his/her opinion with the enterprise, and to exercise at least some measure of control over future contacts. A key element in the invention is that, as described above, a customer may have no notion of how an opinion and/or contact control may be exercised. So, in an embodiment of the invention the functionality is provided, and the customer is informed of its availability.

In one embodiment a customer engaged in a live all with an agent may simply be informed by the agent that he/she may stay connected after a call, and be redirected to a survey system that allows the customer to register an opinion concerning the agent, the service, the product or any other opinion the customer may wish to register with the enterprise. Such surveys are relatively well-known in the art, and may be conducted live by the same or another agent asking questions and recording or entering responses, or may be conducted, for example, by an interactive voice response system. Server 57, for example, may be an IVR system to which the customer, if willing, may be transferred at the end of a transaction, and the IVR may present the customer with specific yes/no questions, or even afford the customer an opportunity to record a more narrative recitation of an opinion.

In one embodiment one of the questions presented might be: "In further contact, do you have a strong preference for interacting with the same agent in the last discussion?" Another might be of the form: "In further contact do you have a strong desire to avoid contact with the same agent as in the last discussion?". An important element in the present invention is that a customer response "Yes" or positive indication to either of these questions, or very similar questions, may be recorded by the system in Stat Server 79, to be used by the routing system of the communication center in further routing.

As an example of such a routing constraint, a customer is informed, either by an agent in a service interaction or by an automatic message, that he/she may elect to interact with a survey system. The customer elects to participate, and at the end of the interaction with the agent, is connected to IVR server 57, which elicits a response from the customer that he/she indeed prefers never to interact with the same agent again. The customer may also describe why, and the system may store that information for use by the enterprise in other ways.

Having received the "prefer not to interact with this agent again" preference of this particular customer, the IVR system 57 stores that information in Stat Server 79, or in a database such as a historical interaction, Customer Relationship Management or a Customer Interaction System database, associated with identification of both the customer and the agent. It should be appreciated by one skilled in the art that the particular choice of where the data stored is not essential, but rather it is the nature of the data stored that is important to the invention. The customer ID may be a name, an origination number from a previous call, and the like. The agent id may be an enterprise assigned ID, a name or the like, and may (or may not) include an agent station ID.

In an embodiment of this invention, routing functionality executed by CTI server 67 and server 29 accesses information in Stat Server 79 for each call received, and in the event of a subsequent call from the same origination number, or somehow identified as the same caller, the routing system accesses whether the same agent is current and available, and, if possible, routes the call, or queues the new call to be routed, to an agent other than the agent the customer would prefer to avoid.

Conversely, if the information in Stat Server 79 is that the customer identified as the caller in a new call received, has indicated that he/she strongly prefers interacting with a particular agent, then the router attempts to route the call to that agent, if available.

In a variant embodiment, a customer may indicate more than one agent preferred, and even a priority preference, and more than one agent to avoid, and perhaps a priority preference, and the routing intelligence will attempt to satisfy the constraints. In still another variant the routing system, having no good alternative may route the call to the same agent, even though the customer has a strong preference to avoid, and may inform the customer, and give the customer an opportunity to call back when the constraint may more readily be satisfied.

In another embodiment the transaction may be an email, or other text-type message, such as SIM, and the customer may be notified in a text response of the mechanism for registering opinion and contact constraint, such as a telephone number for the IVR. In a text variant of the invention the customer may submit a text form, with responses to certain questions to be indicated on the form. Upon submission of the form, which is routed to a server (which may be the same as the IVR server), the system interacts with the form, and stored the opinions and constraints just as before; which may then be used by the system in routing subsequent transactions. In the case of email, the router in the communication center, upon receiving a new email, will check the "From" address, associate with the customer, and route the new email according to the constraints imposed previously by the customer, such as not to route the new email to the same agent as last time, if possible.

Again, there may be situations wherein the system cannot avoid overriding the constraint, and the system may notify the customer in such instance, using preferably the medium the customer used, that he/she may get the same agent not wanted, or not get the agent desired, and give the customer an opportunity to come back at another time. This notification may also indicate when the undesired agent will not be working, or when the desired agent will be available.

In another embodiment, the routing system in the communication center may make reservations for customers with specific agents, and the particular agent is then notified of the reservations, and thus enabled to be available at the set and reserved time.

Embodiments of the invention are not limited to just the communication medium a customer may have used at a particular time when constraints may have been registered. In a multi-media center, customer email addresses, names, telephone numbers, IP addresses and the like may be associated in the Stat Server, so, if a customer who has indicated a constraint by email places a PSTN call at a later time, the system is able to honor the constraints, if possible.

In yet another embodiment of the invention, illustrated simply in FIG. 2, a web site provides the feedback mechanism for customers to register opinions and constraints. Window 201 may be a window in a website, such as a website of the enterprise operating the communication center, a web page, or a window in a third-party site. Such a web page may be provided by one of the servers of the communication center connected to the Internet network.

The content in FIG. 2 is purposely minimal to avoid complicating understanding of the invention. There could be many more survey-type questions, there could be mechanism for allowing a customer much more granularity in stating opinions and desired contact constraints, and many other functions might be provided as well. For example, there might be a media preference, call backs may be indicated, there may be a mechanism for a customer to reserve a particular agent, there may be a mechanism for a customer to qualify for a VIP service, either by purchase history or payment, for example, and many other functions may be provided. A very important element of the invention is in the ability of the customer to set contact constraints that will be honored, if possible by the system in future contacts.

It will be apparent to the skilled artisan that there are many variations that may be made in embodiments described within the spirit and scope of the invention. Some have already been indicated, such as granularity that might be provided in a web site for interacting with customers. There are many more. For example, opinion and constraint may be provided through exchange of SMS messages and the like. Very simple or very elaborate constraints may be provided. Enterprises may mine the interaction history of agents with customers and constraint settings, as a way to evaluate and improve agent performance, and the like. The scope of the invention is limited only by the claims that follow.

I claim:
1. A communication center comprising:
a processor; and
a memory coupled to the processor, wherein the memory has stored thereon instructions that, when executed by the processor, causes the processor to:
identify a particular customer in response to an incoming transaction;
identify a preference of the particular customer to be routed or avoid being routed to a particular agent; and
in response to the particular agent being identified as an only available agent, and further in response to the preference of the particular customer being set as desiring to avoid being routed to the particular agent, transmit a notification to the particular customer of an opportunity for a later transaction when another agent is available.

2. The communication center of claim 1, further comprising:
a router coupled to the processor, the router configured to route the later transaction to the other agent in response to the other agent being identified as being available.

3. The communication center of claim 1, wherein the preference is set after a previous transaction between the particular customer and the particular agent.

4. The communication center of claim 1, wherein the preference is set through interaction between the particular customer and an interactive voice response server (IVR).

5. The communication center of claim 1, wherein the preference is set through interaction between the particular customer and a web site.

6. The communication center of claim 1, wherein the incoming transaction is a live transaction.

7. The communication center of claim 6, wherein the live transaction is a real-time voice transaction.

8. The communication center of claim 6, wherein the live transaction is a real-time text transaction.

9. A method for managing a contact preference in a communication center, the method comprising:
identifying, by a processor, a particular customer in response to an incoming transaction;
identifying, by the processor, a preference of the particular customer to be routed or avoid being routed to a particular agent; and
in response to the particular agent being identified as an only available agent, and further in response to the preference of the particular customer being set as desiring to avoid being routed to the particular agent, transmitting, by the processor, a notification to the particular customer of an opportunity for a later transaction when another agent is available.

10. The method of claim 9, further comprising:
routing, by a router coupled to the processor, the later transaction to the other agent in response to the other agent being identified as being available.

11. The method of claim 9, wherein the preference is set after a previous transaction between the particular customer and the particular agent.

12. The method of claim 9, wherein the preference is set through interaction between the particular customer and an interactive voice response server (IVR).

13. The method of claim 9, wherein the preference is set through interaction between the particular customer and a web site.

14. The method of claim 9, wherein the incoming transaction is a live transaction and the live transaction is a real-time voice transaction.

15. The method of claim 9, wherein the incoming transaction is a live transaction and the live transaction is a real-time text transaction.

16. A router for routing transactions to agents in a communication center, wherein the router is configured to:
identify a customer upon receiving a transaction to route;
access stored rule sets associated with a plurality of customers; and
find a stored rule set associated with the customer who initiated the transaction, and apply the rule set in routing the transaction,
wherein individual ones of the rule sets include one or more constraints created and/or edited by the customer associated with the rule set, said one or more constraints including at least a preference for contact or for avoiding contact with a particular agent of the agents in the communication center, wherein if the particular agent is an only agent of the agents available at a time of a live transaction from the customer, routing the transaction to the particular agent if the constraint is set for contact and notifying the customer if the constraint is set for avoiding contact and offering the customer an opportunity to call back when the constraint can be met.

17. The router of claim 16, wherein rule sets are initiated or edited by the customer during or after interaction with the particular agent of the communication center.

18. The router of claim 17, wherein a mechanism for initiating or editing is an interactive voice response server with functionality for interacting with the customer.

19. The router of claim 17, wherein a mechanism for initiating or editing a rule set is a web site.

20. The router of claim 16, wherein the live transaction is a real-time voice transaction or text transaction.

* * * * *